United States Patent [19]

Loukos

[11] Patent Number: 4,501,599
[45] Date of Patent: Feb. 26, 1985

[54] METHOD AND APPARATUS FOR CLEANING WASTE GASES FROM ALUMINUM PRODUCTION FACILITIES

[75] Inventor: Isaias Loukos, Knoxville, Md.

[73] Assignee: Pennsylvania Engineering Corporation, Pittsburgh, Pa.

[21] Appl. No.: 470,787

[22] Filed: Mar. 1, 1983

Related U.S. Application Data

[63] Continuation-in-part of Ser. No. 327,360, Dec. 4, 1981, abandoned.

[51] Int. Cl.³ .............................................. B01D 53/06
[52] U.S. Cl. ............................................ 55/71; 55/79; 55/390
[58] Field of Search ................... 55/71, 77, 79, 97, 99, 55/387, 390, 474, 479, 262; 423/21.05, 240; 422/145, 176, 177, 213, 220; 34/57 R; 426/118; 75/25, 60, 68 R; 204/67; 266/157, 158

[56] References Cited

U.S. PATENT DOCUMENTS

| | | | |
|---|---|---|---|
| 3,503,184 | 3/1970 | Knapp et al. | 55/71 |
| 3,780,497 | 12/1973 | Muhlrad | 55/71 |
| 3,977,846 | 8/1976 | Russell et al. | 55/79 |
| 3,992,176 | 11/1976 | Bohne et al. | 55/71 |
| 4,073,832 | 2/1978 | McGann | 261/118 |
| 4,176,019 | 11/1979 | Dethloff | 204/67 |
| 4,319,890 | 3/1982 | Teller et al. | 55/262 X |

Primary Examiner—Charles Hart
Attorney, Agent, or Firm—Fred Wiviott

[57] ABSTRACT

A system for removing hydrogen fluoride, finely divided solids and hydrocarbons from aluminum production process emissions includes a vertical scrubbing chamber of constant cross section for receiving the emissions, and an injector disposed axially within the scrubbing chamber for injecting finely divided alumina particles radially into the emission stream, and a filtering device for capturing the alumina particles and entrapping pollutants.

14 Claims, 9 Drawing Figures

METHOD AND APPARATUS FOR CLEANING WASTE GASES FROM ALUMINUM PRODUCTION FACILITIES

REFERENCE TO RELATED APPLICATIONS

This is a continuation-in-part of application Ser. No. 327,360 filed Dec. 4, 1981 and now abandoned.

BACKGROUND OF THE INVENTION

This invention relates to method and apparatus for removing pollutants from gaseous emissions emanating from aluminum production processes.

One well-known type of aluminum producing method is a reduction electrolytic process, commonly referred to as reduction potlines, wherein aluminum metal is produced from Alumina ($Al_2O_3$). Those skilled in the art appreciate that two types of electrodes are used in aluminum reduction potline processes. These included prebaked anodes and Soderberg or self-baking electrodes. In both of these aluminum reduction processes, a number of pollutant substances are generated, such as hydrogen fluoride and other fluorine compounds, carbon monoxide, carbon dioxide, sulphur dioxide and hydrocarbons. The hydrocarbons are normally found in the gas stream evolved from Soderberg-type potlines, whereas in prebaked anode-type plants, the hydrocarbons are evolved in the anode fabrication and baking processes called carbon plants, where such electrodes are fabricated.

The gases evolved in these aluminum plant processes not only contain these pollutants but entrained finely divided solid particles of alumina, carbon and electrolytic "bath" (Cryolite, aluminum and/or calcium fluoride). These emissions are commonly vented by means of specially designed hoods and duct work to pollution control devices, to prevent the discharge of pollutants into the atmosphere and for the recovery of valuable fluorine and alumina contained in the gases. In one well-known pollution control system, metal grade alumina is employed for the adsorption and removal of hydrogen fluoride and other fluorine compounds as well as the entrapment of hydrocarbons from gases evolved in electrolytic aluminum manufacturing processes. A principal advantage of using alumina for pollution control and material recovery is that the alumina along with the recovered fluoride can readily be returned to the reduction pots or cells, for use in the aluminum reduction process. As a result, a substantial fluoride saving can be realized. While these gas cleaning methods, usually referred to as dry scrubbing, have certain advantages, they do involve a relatively high cost, a high level of energy consumption and inefficient or unreliable service.

In certain prior art fume treatment systems, alumina in bulk form is discharged directly into horizontal or vertical ducts, through which the waste gases are conducted. In this type of apparatus, the alumina is quickly airborne in the direction concurrent with the gas flow, resulting in limited contact between the alumina particles and the gases and correspondingly limited adsorption of pollutants by the alumina. This results in a reduced scrubbing efficiency. To resolve this problem, other systems such as that shown in U.S. Pat. No. 3,780,497 induce turbulence into the gas flow to improve mixing of the alumina and the gases to thereby obtain higher scrubbing efficiency. However, the increased turbulent flow combined with the highly abrasive properties of alumina, result in the abrasion of the metallic portions of the apparatus, thus introducing impurities such as iron into the aluminum product. Additionally, the action between alumina particles in the turbulent flow and with the metallic surface of the apparatus results in a breakdown or reduction in alumina particle size. This problem is commonly referred to as alumina degradation. In practice, it has been found that the efficiency of modern aluminum reduction cells is impaired by degraded alumina, particularly since the finer alumina particles inertially segregate from the larger particles in storage and conveying systems which handle the alumina from the fume treatment facilities to the potline reduction facilities.

SUMMARY OF THE INVENTION

It is an object of the invention to provide a new and improved method of dry scrubbing the emissions from aluminum reduction plants.

Another object of the invention is to provide a pollution control apparatus for aluminum producing plants used with the aluminum reduction electrolytic process or the anode fabrication and baking process. A further object of the invention is to provide pollution control apparatus for such plants which effectively remove substantially all fluorides and particulates.

Yet another object of the invention is to provide a method of controlling pollutants from an aluminum reduction plant which is less costly and more energy efficient than existing pollution control processes.

A still further object of the invention is to provide a pollution scrubbing chamber for controlling pollution from aluminum reduction plants wherein there is a relatively small pressure drop.

It is another object of the invention to provide an alumina scrubbing method and apparatus which minimizes apparatus abrasion and alumina degradation which will enhance metal purity and production efficiency of the aluminum reduction process.

These and other objects and advantages of the present invention will become more apparent from the detailed description thereof taken with the accompanying drawings.

In general terms, one aspect of the invention comprises providing a vertical scrubbing chamber of substantially constant cross-section and an injector located axially thereof for injecting alumina radially into the stream of emissions passing from aluminum reduction potlines. According to a more specific aspect of the invention, the injector comprises a hollow body having radial openings formed therein for injecting the alumina into the gas stream.

According to one of its aspects, the invention comprises apparatus for removing pollutants from aluminum plant emissions including: a hollow, vertically oriented enclosure defining a scrubbing chamber; an inlet at the lower end of the enclosure and adapted to be connected to receive emissions from an aluminum plant; an outlet at the upper end of the chamber for being coupled to a gas cleaning system; and alumina injector disposed within the chamber and spaced from the walls of the enclosure and being constructed and arranged by injecting alumina particles into an emissions stream passing vertically between the injector and the walls of said enclosure; and means for conducting alumina particles to said injector.

According to another of its aspects, the invention comprises a method of removing hydrogen fluoride, finely divided solids and hydrocarbons from gases evolved from aluminum reduction potlines and anode fabrication and baking plants comprising the steps of: conducting the gases through a vertical scrubbing chamber having a constant cross-sectional area from its lower to its upper end; conducting alumina particles to an injector disposed axially within the chamber; and injecting the particles radially into the gas stream for adsorption of hydrogen fluoride by the alumina and the deposit of hydrocarbons in finely divided alumina particles.

PREFERRED EMBODIMENT OF THE INVENTION

Figure 1:
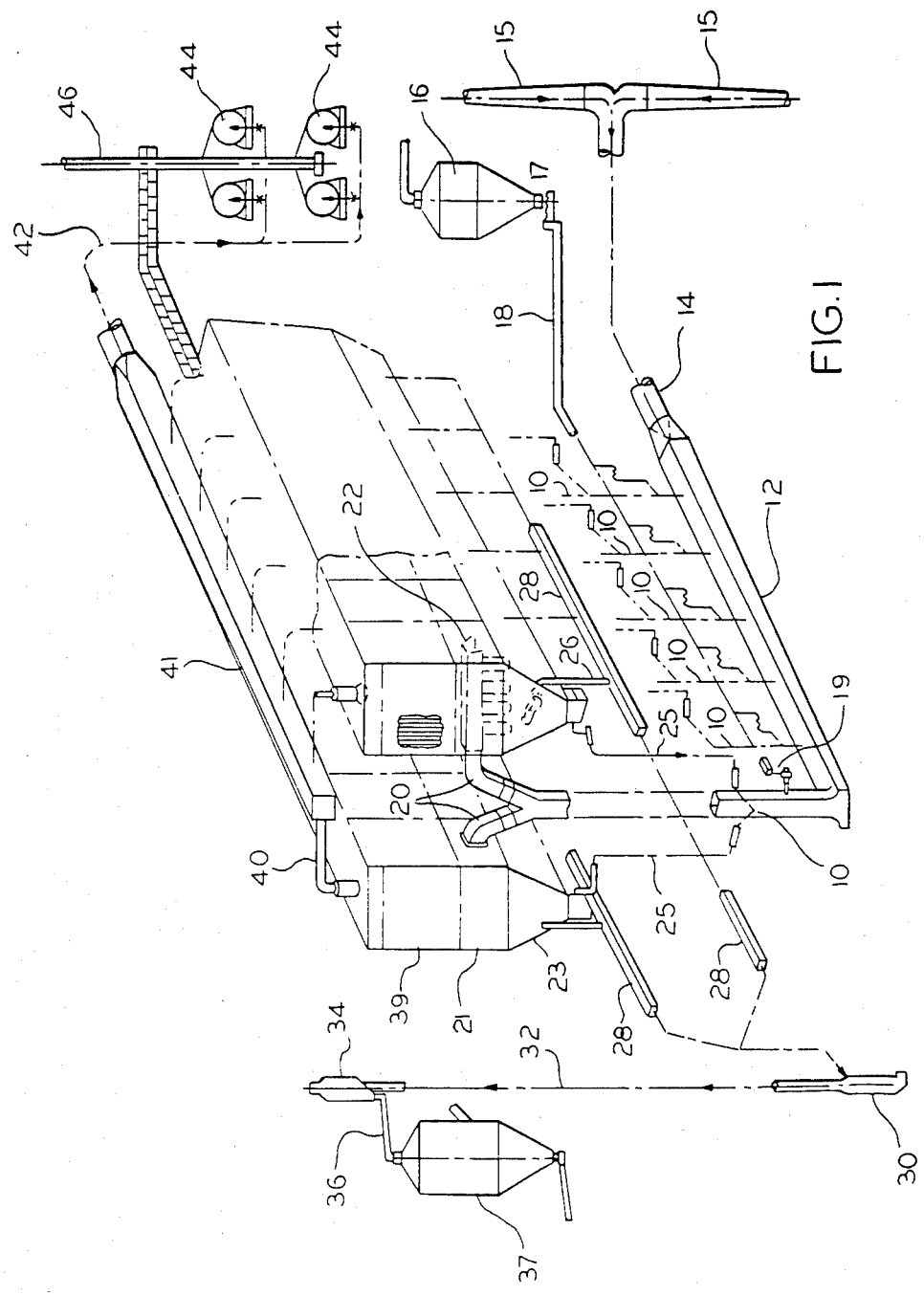
FIG. 1 is a perspective view schematically illustrating the gas cleaning system in which the dry scrubber in accordance with the preferred embodiment in the invention is employed.
Figure 2:
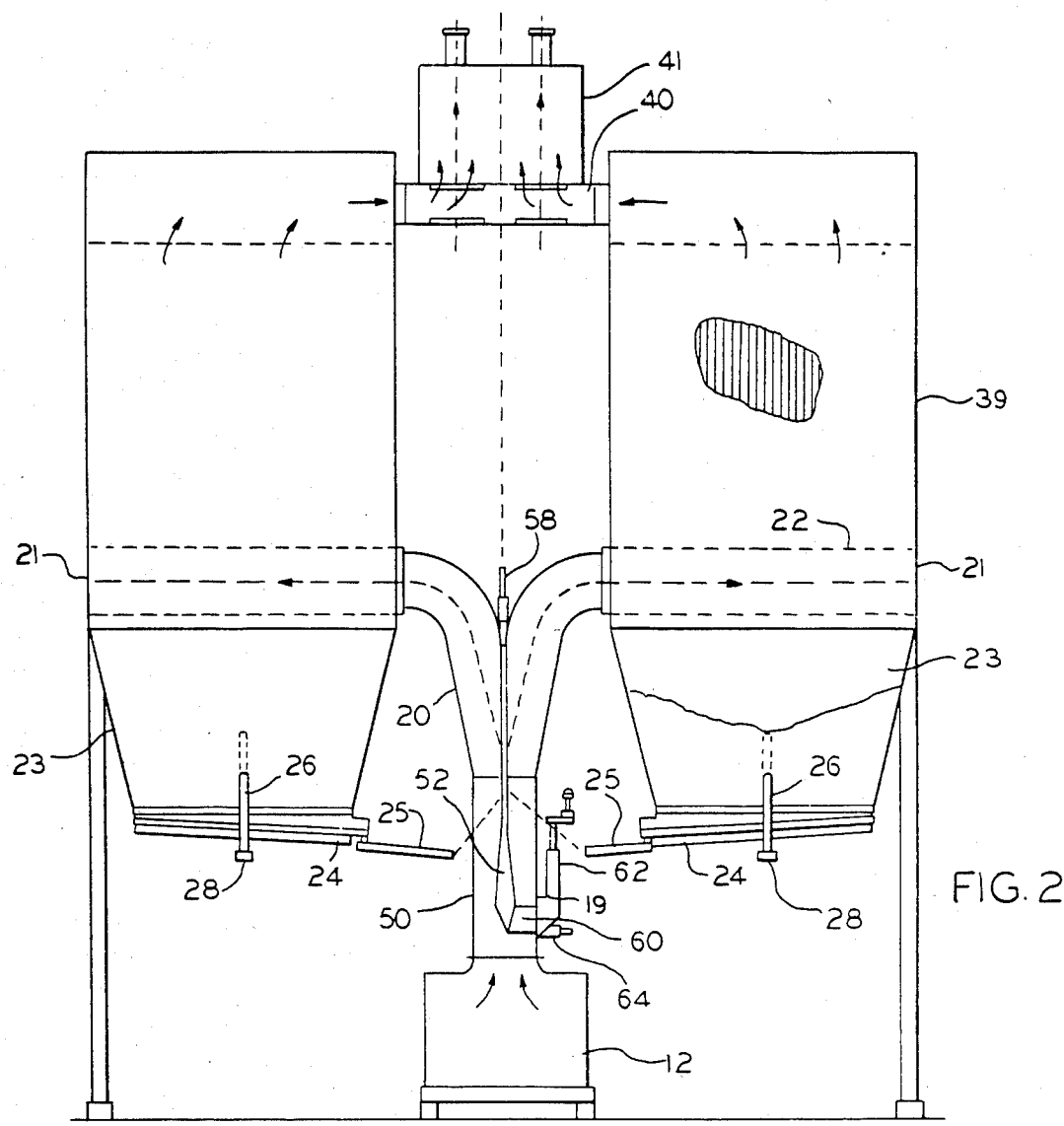
FIG. 2 shows the dry scrubber employed with the apparatus of FIG. 1.

FIGS. 1 and 2 show a pollution control system with which a plurality of scrubbing chambers 10 in accordance with the present invention may be employed. The scrubbing chambers 10 are shown to be vertically oriented and to be connected at their lower ends to a plenum chamber 12 which, in turn, is coupled to one or more aluminum producing plants (not shown) by conduits 14 and 15. Fresh alumina is provided to the scrubbing chambers 10 from a fresh alumina silo 16 by means of a feed rate controller 17 and a conductor 18 which is coupled to the individual scrubbing chambers 10 by a volumetric control unit 19.

The upper end of each scrubbing chamber 10 is connected by a bifurcated conductor 20 to alumina separators 21. The conductor 20 opens into each separator 21 at a point below an inverted channel 22 which extends across the separator but is separated from the sides thereof. As a result, the particle laden gases undergo an angle change as they flow around channel 22. As a result, entrained particles will tend to collect in a dust hopper 23 disposed below each separator 21. Each dust hopper 23 is coupled by a recycle control unit 24 and conductor 25 to its associated scrubbing chamber 10. In addition, overflow tubes 26 connect dust hopper 23 to a conveyor 28 for transporting the alumina and the entrapped pollutants to an airlift 30 which is coupled by a vertical conductor 32 to a deceleration chamber 34. The lower end of the chamber 34 communicates through a conduit 36 to a reacted alumina storage silo 37. An isolation damper 38 is disposed between each outlet of conduit 20 and the respective particle separators 21 so that each may be isolated for cleaning and service.

Disposed above each alumina separator 21 is a dust collector 39 whose upper end is connected by conduits 40 to an exhaust plenum 41. The outlet end of plenum 41 is coupled by conduit 42 to exhaust fans 44 for discharging cleaned gases through exhaust stack 46.

In operation of the apparatus thus far described, a stream of emissions from aluminum producing plants of the aluminum reduction electrolytic process or the anode fabrication and baking process is conducted by conduits 14 and 15 to the inlet plenum 12 from which it is passed to the individual scrubbing chambers 10. Alumina of metal grade is injected at controlled rates by volumetric controls 19 into the scrubbing chambers 10 in a manner which will be discussed more fully below. These emissions will normally contain hydrogen fluoride and other fluorine compounds, carbon monoxide, carbon dioxide, sulphur dioxide and hydrocarbons. In the scrubbing chamber, the alumina particles become diffused and adsorb the pollutants in these emissions.

The alumina particles and the adsorbed pollutants pass upwardly through the scrubbing chamber 10 and into the alumina separators 21 where the larger alumina particles are separated from the gas stream by gravity while the finer particles are separated in the dust collectors 39 which may, for example, comprise fabric type filters. The alumina and adsorbed pollutants collected from the separator 21 and the dust collector 39 can be recycled to the scrubbing chamber by control 24 for additional scrubbing. If the dust is not recycled, it will flow through overflow pipes 26 to conveyor 28 for transport to airlift 30 which forces the particles upwardly to deceleration chamber 34 for separation and transfer to storage silo 37 from which it may be transferred to the potlines for reduction to aluminum metal. The choice of whether to recycle the particles is primarily determined by the concentration of pollutants in the gas stream and the quality of specific surface of the alumina employed for the scrubbing function.

The exhaust fans 44 draw the clean emissions from the upper end of dust collectors 39 and into the exhaust plenum 41 from which it passes to the exhaust stack 46.

Figure 3:
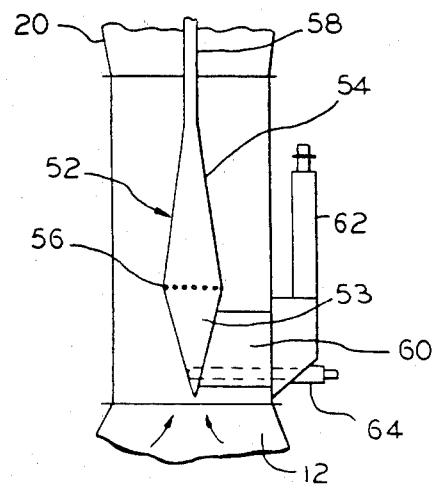
FIG. 3 shows a portion of the dry scrubber of FIG. 2 in greater detail.

FIG. 2 shows the scrubbing chamber 10 in greater detail to include a vertical, open-ended housing 50 having a generally uniform cross-sectional throughout its length. Housing 50 is connected at its lower end to plenum chamber 12 and at its upper end to the bifurcated conduit 20. Disposed along the axis of housing 50 is a radial injector 52 which is shown more particularly in FIG. 3 to comprise a hollow member formed by opposed upper and lower conical sections 53 and 54.

At the lower end of section 53 there are a plurality of radial openings 56 which are disposed in a generally circular array. A conduit 58 connects the upper end of injector 52 to the recycle control unit 24 by conductor 25 (See FIG. 1). In addition, alumina may be delivered to the injector 52 by means of an inlet channel 60 which communicates with the injector portion 54 below apertures 56. The outer end of channel 60 is connected to a pipe whose opposite end is coupled to the alumina supply conduit 18 and/or 25. Disposed along the lower part of channel 60 and into the injector 52 is fluidizing element 64 which provides a fluidizing conveyer type surface for the alumina conducted therethrough, substantially in bulk form to the injector 52.

In operation, the emissions from aluminum production processes, which are normally at a temperature of about 150°–270° F., are delivered to the inlet plenum 12 for distribution to each of the scrubbing chambers 10. Simultaneously, alumina is introduced into the interior of the injector 52 for discharge through the openings 56 substantially under gravity flow and thereby with insignificant particle inertia. The alumina particles introduced by injector 52 are diffused into the gas stream for adsorption of the pollutants. In the preferred embodiment of the invention, the alumina particles are diffused into the gas stream at the rate of 4-8 grains of alumina per actual cubic feet to gas conducted through the scrubbing chamber and with the alumina having a surface of about 30-60 square meters per gram.

The alumina to gas contact in the present invention is achieved with a minimum pressure loss across the scrubbing chamber as compared to prior art systems. For example, dry scrubbers generally known as the turbulent flow scrubbing column type, such as that shown in U.S. Pat. No. 3,780,497, require two or more inches of water column pressure loss for the scrubbing function and scrubbers known as the fluidized bed type require eight to twelve inches of water column pressure loss to achieve this result. In the scrubber of the present invention, only about one inch total pressure loss is required to perform the scrubbing function. This is significant because in an average aluminum reduction plant of 180,000 to 200,000 tons of metal production per year, the extra power expended for each additional inch of pressure loss for the treatment of emissions is about 330 kw with corresponding higher operating energy costs.

The method and apparatus according to the invention maximize the opportunity for close contact of finely divided particles of alumina and aluminum production process emissions as a result of uniform diffusion. This is of particular importance in order to optimize the efficiency of the dry scrubbing function since it is known that the stable (stable bond or chemisorption) fluoride carrying capacity of alumina is from 0.9 to 1.8% of its weight, depending on the specific surface of alumina which may vary from 30 to 60 square meters per gram. It is therefore highly advantageous to achieve maximum uniform contact of alumina particles with the gases during the scrubbing function, thus making maximum use of the adsorption capacity of each alumina particle to optimize the scrubbing efficiency. The apparatus according to the invention not only achieves high scrubbing efficiency but is relatively simple and economical and achieves reduced overall pressure loss.

Figure 4:
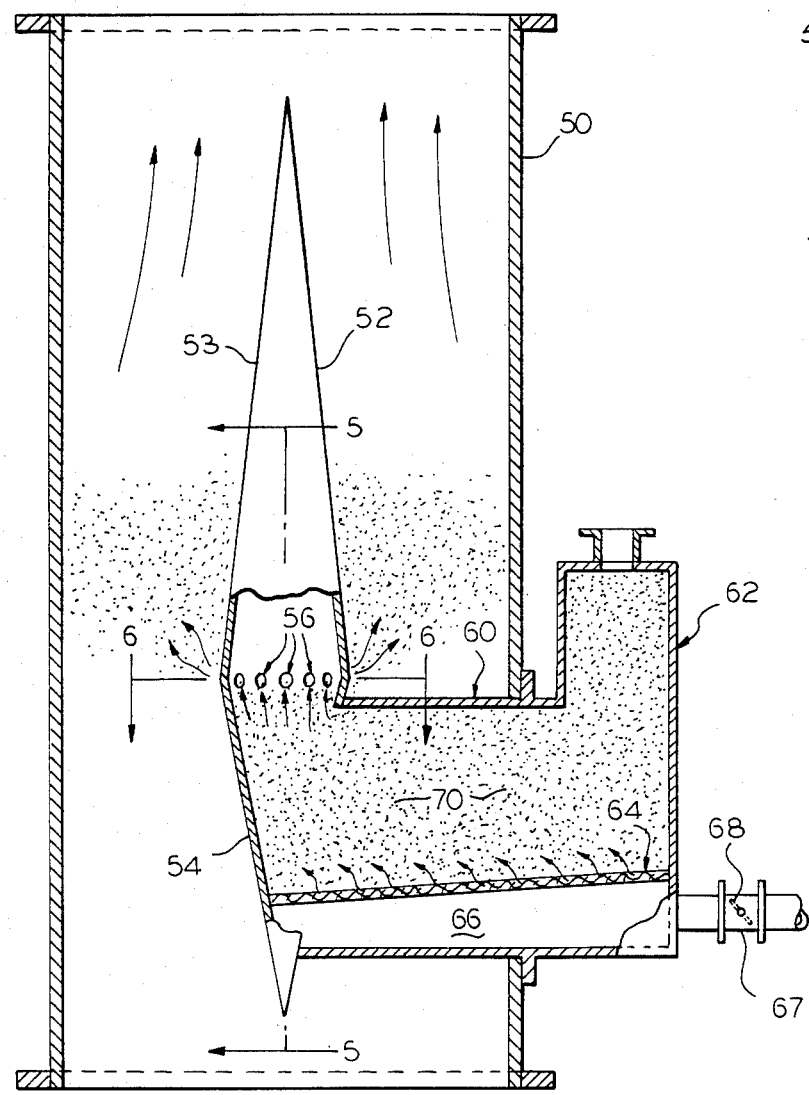
FIG. 4 is an enlarged view, with parts broken away, of the dry scrubber in accordance with the preferred embodiment of the invention.
Figure 5:
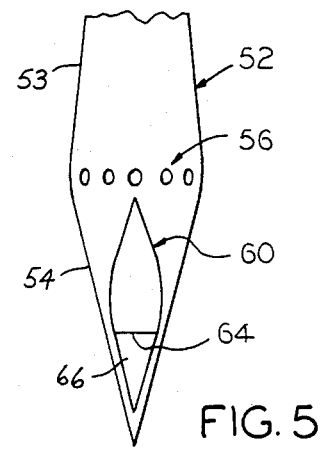
FIG. 5 is a view taken along lines 5—5 of FIG. 4.
Figure 6:
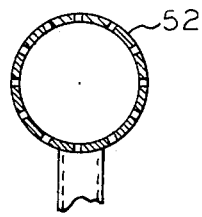
FIG. 6 is a view taken along lines 6—6 of FIG. 4.
Figure 7:
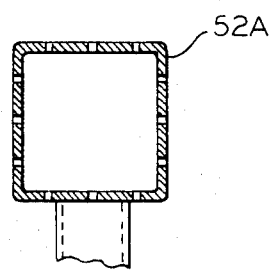
FIGS. 7, 8 and 9 are fragmentary views of alternate embodiments of an invention.
Figure 8:
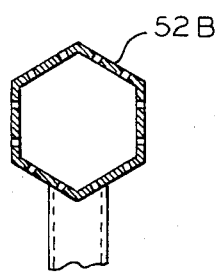
Figure 9:
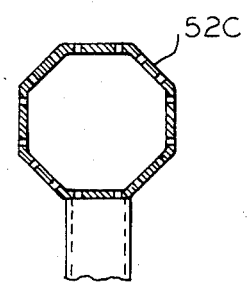

FIG. 4 shows the dry scrubber having a radial injector 52 with the upper and lower sections being relatively steep sided and having relatively small apex angles. The inlet channel 60 has a material feed pipe 62 connected thereto and extending from its outer end to project above the level of the openings 56 in injector 52.

The number of openings 56 may vary such as for example about eight to sixteen, depending on the size of the apparatus. At the lower end of the channel 60 is permeable membrane or plate 64 which defines a plenum chamber 66 below the main portion of the channel 60. The membrane or plate 64 may be composed of any suitable material, such as fabric or metal and preferably is constructed and arranged to allow approximately 6 to 8 cubic feet of air per minute to permeate therethrough under a pressure of approximately one PSI which is supplied to the chamber 66 by an inlet pipe 67. In order to control airflow to chamber 66, a flow control damper 68 may be disposed within pipe 67.

The injector and feed systems shown in FIG. 4 are constructed and arranged to provide a gravity flow of alumina particles 70 from the feed pipe 62 through the channel 60 and injector 52 to the openings 56. Because the feed pipe 62 is above the openings 56, the fluidized particles will flow out of openings 56. However, the exit velocity will be relatively low as a result of the negligible air flow through openings 56.

The relatively slow rate of movement of the alumina particles between the feed pipe 62 and the apertures 56 minimize the abrasion between the particles and the conveying and feed apparatus. Additionally, the alumina being supported by the fluidized membrane 64 which may, for example, be at a slight angle, about 4°, provides an air-gravity conveyor for transporting the material through the channel 60 and toward the apertures 56. This promotes the uniform discharge of alumina particles at relatively low velocity and virtually no secondary air flow from these openings and into the gases passing upwardly through the duct 50. A suitable feeding device may be coupled to the upper end of feed pipe 62 for providing alumina particles at a controlled rate which is equal to the discharge rate from openings 56.

As a result of the relatively low velocity at which the particles are discharged from openings 56, particle inertia is relatively insignificant thus minimizing abrasion. In addition, because the particles are injected at a plurality of points around the injector 52, more uniform particle distribution is obtained, thereby increasing contact between the particles and the gas stream.

Preferably, the cross section area of the injector 52 at its widest point is only 5 to 6 percent of the total area of duct 50. In addition, the included angles at the apexes of the sections 53 and 54 are relatively small. For example, the angle of section 53 is preferably about 10° to 15° and that of the section 54 about 22–27. This also tends to minimize turbulence as the gases flow around the injector 52 and thereby minimize apparatus abrasion and alumina degradation due to limited turbulent action induced on the highly abrasive alumina particles.

The injector 52 is shown in FIG. 6 to be relatively circular in horizontal section. However, the sections 53 and 54 may have other convenient shapes in horizontal cross section such as the rectangular configuration 52A shown in FIG. 7; the hexagonal shape 52B shown in FIG. 8; and the octagonal shape 52C shown in FIG. 9.

While only a single embodiment of the invention is illustrated and described, it is not intended to be limited thereby, but only by the scope of the appended claims.

I claim:

1. Apparatus for removing pollutants from aluminum plant emissions including:

a hollow, vertically oriented enclosure defining a scrubbing chamber, an inlet at the lower end of said enclosure and adapted to be connected to receive emissions from an aluminum plant, an outlet at the upper end of said chamber for being coupled to a gas cleaning system, alumina injector means disposed within said chamber and spaced from the walls of said enclosure, said injector means being constructed and arranged for introducing alumina particles into an emissions stream passing vertically between the injector means and the walls of said enclosure, and means for fluidizing the alumina particles and conducting the same to the interior of said injector means, said injector means comprises a hollow body disposed along the axis of said enclosure and diverging from its upper and lower ends to a wider midregion, said body having a plurality of perforations formed in said midregion for flowing the fluidized alumina particles at a gravity flow and in bulk form horizontally into the gas emission stream moving vertically between the lower and upper ends of said enclosure whereby turbulence in said stream and particle degredation and apparatus abrasion is minimized.

2. The apparatus set forth in claim 1 wherein said enclosure has a substantially uniform cross-sectional area from its lower to its upper end.

3. Apparatus for removing pollutants from aluminum plant emissions including:

a hollow, vertically oriented enclosure defining a scrubbing chamber and having a substantially uniform cross-sectional area from its lower to its upper end, an inlet at the lower end of said enclosure and adapted to be connected to receive emissions from an aluminum plant, an outlet at the upper end of said chamber for being coupled to a gas cleaning system, alumina injector means disposed within said chamber and along the axis thereof and spaced from the walls of said enclosure, said injector means being constructed and arranged for introducing alumina particles into an emissions stream passing vertically between the injector means and the walls of said enclosure, said injector means comprising a hollow body which includes upper and lower generally peaked sections and diverging from its upper and lower ends to a wider midregion, said body having a plurality of perforations formed in a generally horizontal array in said midregion, means for fluidizing said alumina particles and for conducting the same to the hollow interior of said injector at a pressure head greater than the height of said openings so that said alumina particles will pass by gravity flow through said openings and in bulk form horizontally into the gas emission stream moving vertically between the lower and upper ends of said enclosure whereby turbulence in said stream is minimized.

4. The apparatus set forth in claim 3 and including particle separator means for removing alumina particles and adsorbed pollutants from said emission stream and suction means producing a gas flow from lower end of said scrubbing chamber through said gas cleaning means.

5. The apparatus of claim 3 wherein the included angles of the apexes of the upper and lower sections are relatively small to minimize the induction of turbulence in the alumina particles distributed and thereby reduce apparatus abrasion and alumina degradation.

6. The apparatus of claim 3 wherein the upper and lower generally peaked sections have a horizontal sectional shape which is generally round.

7. The apparatus of claim 3 wherein the upper and lower generally peaked sections have a horizontal sectional shape which is a geometric shape having at least four sides.

8. The apparatus set forth in claim 3 wherein said particle conducting means comprises a chamber coupled to said injector means, means within said chamber for fluidizing alumina particles, at least a portion of said chamber being at an elevation greater than that of said perforations whereby said particles will flow under the influence of gravity out of said perforations at a relatively negligible inertia to minimize turbulence in said enclosure as said particles are delivered thereto.

9. The apparatus of claim 8 wherein the included angles of the apexes of the upper and lower sections are relatively small to minimize the induction of turbulence in the alumina particles distributed and thereby reduce apparatus abrasion and alumina degradation.

10. The apparatus set forth in claim 9 and including particle separator means for removing alumina particles and adsorbed pollutants from said emission stream and suction means producing a gas flow from lower end of said scrubbing chamber through said gas cleaning means.

11. A method of removing hydrogen fluoride, finely divided solids and hydrocarbons from gases evolved from aluminum reduction potlines and anode fabrication baking plants comprising the steps of:

conducting the gases through a vertical scrubbing chamber having a constant cross-sectional area from its lower to its upper end, fluidizing alumina particles, flowing said fluidized alumina particles to the interior of an injector disposed axially within said chamber and having a plurality of spaced apart openings disposed therein, flowing said alumina particles by gravity radially from said injector into said gas stream for adsorption of hydrogen fluoride by the alumina and the deposit of hydrocarbons in finely divided alumina particles.

12. The method set forth in claim 11 wherein alumina particles and entrapped pollutants are separated from said gas stream and at least a portion is returned to the scrubbing chamber for additional scrubbing while the balance is returned to said aluminum reduction potlines.

13. The method set forth in claim 12 wherein said alumina particles are diffused in said gas stream at the rate of 4–8 grains of clean alumina per actual cubic foot of gas conducted through said scrubbing chamber with the specific surface of said alumina being 30–60 square meters per gram.

14. The method in accordance with claim 13 in which the pressure difference between the lower and upper ends of said scrubbing chamber is equal to or less than one inch of water.

* * * * *

UNITED STATES PATENT AND TRADEMARK OFFICE
CERTIFICATE OF CORRECTION

PATENT NO. : 4,501,599
DATED : Feb. 26, 1985
INVENTOR(S) : Isaias Loukos

It is certified that error appears in the above-identified patent and that said Letters Patent are hereby corrected as shown below:

On the title page;
[73] Assignee: No Assignee

Signed and Sealed this

Eighth Day of October 1985

[SEAL]

Attest:

DONALD J. QUIGG

Attesting Officer

Commissioner of Patents and
Trademarks—Designate